US006357041B1

(12) United States Patent
Pingali et al.

(10) Patent No.: US 6,357,041 B1
(45) Date of Patent: Mar. 12, 2002

(54) DATA-CENTRIC MULTI-LEVEL BLOCKING (75) Inventors: Keshav K. Pingali, Ithaca, NY (US); Induprakas Kodukula, Dallas, TX (US); Nawaaz Ahmed, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/450,888

(22) Filed: Nov. 29, 1999

Related U.S. Application Data (63) Continuation of application No. PCT/US98/10938, filed on May 29, 1998.
(60) Provisional application No. 60/047,382, filed on Jun. 2, 1997.

(51) Int. Cl.[7] .............................................. G06F 9/45
(52) U.S. Cl. ......................................................... 717/9
(58) Field of Search ............................................. 717/9

(56) References Cited

U.S. PATENT DOCUMENTS

| | | | |
|---|---|---|---|
| 5,175,837 A | * 12/1992 | Arnold et al. ............... | 711/152 |
| 5,717,893 A | * 2/1998 | Mattson ....................... | 711/129 |
| 5,754,888 A | 5/1998 | Yang et al. .................. | 395/872 |
| 5,790,828 A | 8/1998 | Jost ............................. | 395/404 |

OTHER PUBLICATIONS

Steve Carr and R.B. Lehoucq, "Compiler Blockability of Dense Matrix Factorizations", Oct. 2, 1996.
Steve Carr and R.B. Lehoucq, Chapter I—*A Compiler–Blockable Algorithm for QR Decomposition*. Oct. 1996.
Michael E. Wolf and Monica S. Lam, "A Data Locality Optimizing Algorithm", Computer Systems Laboratory, Stanford University, CA 94305. Jun. 1991.
Michal Cierniak and Wei Li, "Unifying Data and Control Transformations for Distributed Shared–Memory Machines", Department of Computer Science, University of Rochester, Rochester, NY 14627. Jun. 1995.
Kathryn S. McKinley (University of Massachusetts at Amherst), Steve Carr (Michigan Technological University), and Chau–Wen Tseng (University of Maryland at College Park), "Improving Data Locality with Loop Transformations". Jul. 1996.
Monica S. Lam, Edward E. Rothberg, and Michael E. Wolf, "The Cache Performance and Optimizations of Blocked Algorithms", Computer Systems Laboratory, Stanford University, CA 94305; Fourth Intern. Conf. On Architectural Support for Programming Languages and Operating Systems (ASPLOS IV), Palo Alto, California, Apr. 9–11, 1991.
J. Ramanujam (Dept. of Electrical and Computer Engineering, Louisiana State University, Baton Rouge, LA 70803–5901) and P. Sadayappan (Dept. of Computer and Information Science, The Ohio State University, Columbus, OH 43210–1277), "Tiling Multidimensional Iteration Spaces for Multicomputers". Oct. 1992.

(List continued on next page.)

*Primary Examiner*—Tuan Q. Dam
*Assistant Examiner*—John Q. Chavis
(74) *Attorney, Agent, or Firm*—Perkind, Smith & Cohen, LLP; Christine M. Kuta; Jacob N. Erlich (57) ABSTRACT

A framework for improving program performance by locality-enhancing transformations is presented. This framework is appropriate for modern high-performance machines that have a memory hierarchy. The invention orchestrates the flow of data through the memory hierarchy directly, and is thus able to overcome limitations of existing approaches. This new approach allows for efficient execution of imperfectly nested loop programs which are ubiquitous in numerical calculations and database operations, and it can be integrated into high-performance optimizing compilers.

12 Claims, 7 Drawing Sheets

OTHER PUBLICATIONS

Jennifer M. Anderson, Saman P. Amarasinghe, and Monica S. Lam, Computer Systems Laboratory, Stanford University, CA 94305, "Data and Computation Transformations for Multiprocessors". Jun. 1995.

Pierre Boulet, Alain Darte, Tanguy Risset, and Yves Robert, Laboratoire LIP–IMAG, CNRS URA 1398, Ecole Normale Superieure de Lyon, 69364 Lyon Cedex 07, "(Pen)–ultimate tiling?", Nov. 9, 1993.

Steve Carr (Michigan Technological University), Kathryn S. McKinley (University of Massachusetts), and Chau–Wen Tseng (Stanford University), "Compiler Optimizations for Improving Data Locality". Oct. 1994.

Larry Carter (University of California at San Diego); Jeanne Ferrante (University of California at San Diego), and Susan Flynn Hummel (Polytechnic University, Brooklyn, NY), "Hierarchical Tiling for Improved Superscalar Performance". Apr. 1995.

V. Sarkar, "Automatic Selection of High–Order Transformations in the IBM XL Fortran Compilers", 1997 IBM.

William Pugh, University of Maryland, College Park, MD 20742, "The Omega Test: a fast and practical integer programming algorithm for dependence analysis", Jul. 12, 1993; Originally appeared at Supercomputing '91. This expanded version appeared in Comm. of the ACM, Aug. 1992.

Anne Rogers and Keshav Pingali, "Process Decomposition Through Locality of Reference", TR88–935, Aug. 1988; Department of Computer Science, Cornell University, Ithaca, NY 14853–7501.

Ramesh C. Agarwal and Fred G. Gustavson, "Algorithm and Architecture Aspects of the Pr ESSL BLAS on Power2", IBM 1996.

* cited by examiner

Right-looking Cholesky

FIG. 1A

Left-looking Cholesky

FIG. 1B

Update diagonal block from left

FIG. 2A

Cholesky factor diagonal block

FIG. 2B

Update off-diagonal block from left

FIG. 2C

Internal scale+update

DATA-CENTRIC MULTI-LEVEL BLOCKING

CROSS REFERENCE TO RELATED APPLICATIONS

This application is a continuation of pending international application number PCT/US98/10938 filed May 29, 1998 entitled "Data-Centric Multi-Level Blocking" and which in turn claims priority from the U.S. Provisional Application, Ser. No. 60/047,382 filed Jun. 2, 1997, entitled DATA-CENTRIC MULTILEVEL BLOCKING, by the present inventors.

STATEMENT OF GOVERNMENT INTEREST

This invention was made with U.S. Government support from the National Science Foundation (NSF) under Grant No. CCR-9503199 and ONR Grant No. N00014-931-0103. The U.S. Government has certain rights in the invention.

FIELD OF THE INVENTION

This invention relates generally to improving the performance of high level programs on practical computing systems by enhancing data reuse through program transformations. More particularly, the present invention relates to program transformations that are derived automatically in a compiler by consideration of the flow of data blocks through the memory hierarchy of the computer system.

BACKGROUND OF THE INVENTION

Increases in the speed of microprocessors have not been matched by commensurate increases in the speed of main memory (DRAM). Therefore, many applications are now memory-bound in the sense that the CPU is stalled a significant proportion of the time, waiting for memory to provide it with data. Therefore, these applications cannot take advantage of fast processors. One solution is to use fast memory (SRAM) but that is prohibitively expensive. The preferred solution is to have a memory hierarchy in which a small amount of fast SRAM (the cache) is coupled with EL large amount of slower DRAM (the memory). At any point in time, the cache contains a copy of some portion of main memory. When the processor needs to access an address, the cache is first searched to see if the contents of that address are already available there. If so, the access is said to be a hit, and the required data is acquired from the (fast) cache; otherwise, the access is said to be a miss, and the required data is accessed from the (slow) memory and a copy of this data is left in the cache for future reference. Since the size of the cache is small compared to the size of the memory, some data (called the victim data) must be displaced from the cache to make room for the new data.

For a program to perform well on a machine with a memory hierarchy, most of its data accesses must result in hits. This is the case if the program exhibits data reuse (that is, it accesses the same data several times), and if these accesses are sufficiently close together in time that all the accesses other than the first one result in hits. Many important codes exhibit data reuse. For example, given two n-by-n matrices, matrix multiplication performs n-cubed operations on n-squared data; so each data element is accessed n times. Other important codes like Cholesky and LU (Lower Upper) factorization (both well known in the art) also entail substantial data reuse. Given an algorithm with data reuse, it is important to code it in such a way that the program statements that touch or accesses a given location are clustered in time (otherwise, the data may be displaced from cache in between successive access to make room for other data that may be accessed). Unfortunately, coding such algorithms manually is tedious and error-prone, and makes code development and maintenance difficult. For example, a straightforward coding of Cholesky factorization requires about ten lines of code; coding it carefully to cluster accesses to the same address requires about a thousand lines of code. This difficulty increases as the memory hierarchy becomes deeper. Moreover, the program is made less abstract and less portable because of the introduction of machine dependencies.

One approach to addressing this problem is to use a compiler to transform easily-written high-level codes into low-level codes that run efficiently on a machine with a memory hierarchy. A variety of program transformations have been developed by the compiler community. These transformations are called "control-centric" transformations because they seek to modify the control flow of the program to improve data locality. The scope of these transformations is limited to "perfectly nested loops" (loops in which all assignment statements are contained in the innermost loop in the loop nest). The most important transformation is called tiling; in some compilers, tiling is preceded by "linear loop transformations" which include permutation, skewing and reversal of loops. These techniques are well known in the art.

A significant limitation of this technology is that the scope of the transformations is limited to perfectly nested loops. Although matrix multiplication is a perfectly nested loop, most applications like Cholesky and LU factorization are not perfectly nested loops. In principle, some of these applications can be transformed into perfectly nested loops which can then be tiled; however, the performance of the resulting code is somewhat unpredictable and is often quite poor.

Many known techniques used in conjunction with the general problems are well disclosed in the book authored by Michael Wolfe, HIGH PERFORMANCE COMPILERS FOR PARALLEL COMPUTING, published by Addison-Wesley in 1995. This book is incorporated herein by reference.

It is therefore an object of this invention to provide a system and process for enhancing data reuse by focusing on the data flow rather than on the control flow.

It is a further object of this invention to provide data-centric multilevel blocking technique for compilers and data base programs.

It is still a further object of this invention to provide means for automatically handling transformations of imperfectly nested loops in an efficient manner.

SUMMARY OF THE INVENTION

The objects set forth above as well as further and other objects and advantages of the present invention are achieved by the embodiments and techniques of the invention described below.

The present invention provides a new approach to the problem of transforming high-level programs into programs that run well on a machine with a memory hierarchy. Rather than focus on transforming the control flow of the program, the compiler determines a desirable data flow through the memory hierarchy, and transforms the program to accomplish this data flow. The key mechanism in this "data-centric" approach to locality enhancement is the "data shackle." The inventive approach is to investigate all the program statements that touch upon data in a cache memory and to perform all the operations on that data without restrictions, thereby providing advantages of enhancing data reuse and speed.

A data shackle is a program mechanism defined by a specification of (i) the order in which the elements of an array must be brought into the cache, and (ii) the computations that must be performed when a given element of the array becomes available from the cache, The order in which data elements must be brought into the cache may be specified by dividing the array into "blocks" (using cutting planes parallel to the array axes), and determining an order in which these blocks are to be brought into the cache. The computations that should be performed when a particular block of the array is brought into the cache are specified by selecting a reference to the array from each program statement; when a data block is brought into the cache, all instances of the program statement for which the selected reference accesses data in the current block are executed. In this fashion the data reuse in the cache is maximized.

Data shackles can be combined together to produce composite shackles. These shackles can operate on the same data structure to enhance the data reuse for other references or to exploit reuse for deeper memory hierarchies or on different data-structures to improve data reuse for other arrays. This is required for codes like matrix multiplication that work with several arrays at a time. Once the compiler has decided on the data shackles it will use, it can generate code to conform to these specifications.

The inventive data-centric approach to generating code that exploits data reuse has many advantages over existing control-centric approaches. Current control-centric technology only works for a subset of programs where reuse is present in perfectly nested loops. The data-centric approach in contrast works for all programs since it is based on orchestrating data movement directly rather than indirectly as a result of control flow transformations.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS AND TECHNIQUES

For a clearer understanding of the present invention, it is helpful to first review the nested loops exemplified by the following three codes (i), (ii) and (iii):

(i) Matrix Multiplication
    do I=1..N
      do J=1..N
        do K=1..N
          C[I,J]=C[I,J]+A[I,K]*B[K,J]
(ii) Right-looking Cholesky Factorization
    do J=1..N
    S1: A[J,J]=sqrt (A[J,J])
    do I=J+1..N
      S2: A[I,J]=A[I,J]/A[J,J]
    do L=J+1..N
      do K=J+1..L
        S3: A[L,K]=A[L,K]−A[L,J]*A[K,J]
(iii) Left-looking Cholesky Factorization
    do J=1..N
    do L=J..N
      do K=1..(J−1)
        S3: A[L,J]=A[L,J]−A[L,K]*A[J,K]
    S1: A[J,J]=sqrt(A[J,J])
    do I=J+1..N
      S2: A[I,J]=A[I,J]/A[J,J]

Figure 1A:
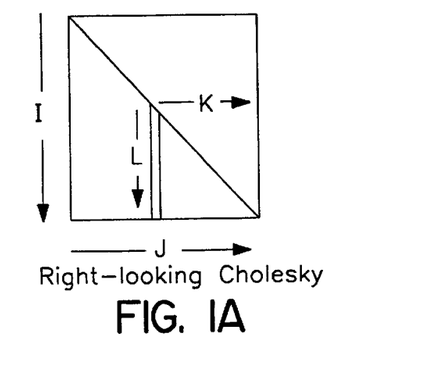
FIGS. 1A and 1B are representations of right-looking and left-looking Cholesky factorization, respectively.
Figure 1B:
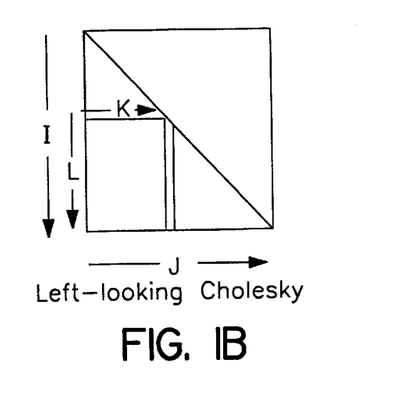

The above codes disclose three important computational kernels that illustrate the concepts addressed by the present invention. (i) shows matrix multiplication in the so-called I-J-K order of loops. It is elementary for a compiler to deduce the well-known fact that all six permutations of these three loops are legal. This loop is called a perfectly nested loop because all assignment statements are contained in the innermost loop. (ii,iii) show two versions of Cholesky factorization called right-looking and left-looking Cholesky factorization; both these loop nests are imperfectly nested loops. Both codes traverse the matrix A a column at a time. In right-looking Cholesky, the columns to the right of the current column are updated by the L-K loop nest, using the outer product of the current column, as shown in FIG. 1A. The L and K loops are called the update loops. Left-looking Cholesky performs lazy updates in the sense a column is updated only when it is visited by the outermost loop. The shaded area to the left of the current column in FIG. 1B shows the region of the matrix that is read for performing this update.

The numerical analysis community has used a layered approach to the problem of writing portable software with good data reuse. The general idea is to (a) find a set of core operations for which algorithms with good data reuse are known, (b) implement carefully hand-tuned implementations of these algorithms on all platforms, and (c) use those operations, wherever possible, in writing programs for applications problems. From Amdahl's law, it follows that if most of the computational work of a program is done in the core operations, the program will perform well on a machine with a memory hierarchy. While the implementations of these operations are not portable, the rest of the software is machine-independent.

In the context of dense numerical linear algebra, the core operation is matrix multiplication. The standard algorithm for multiplying two n by n matrices performs $n^3$ operations on $n^2$ data, so it has excellent data reuse. Most vendors provide so-called Level-3 BLAS routines which are carefully hand-optimized, machine-tuned versions of matrix multiplication. To exploit these routines, the numerical analysis community has invested considerable effort in developing block-matrix algorithms for standard dense linear algebra problems such as CholLesky, LU and QR factorizations. These block algorithms operate on entire sub-matrices at a time, rather than on individual matrix elements, and are rich in matrix multiplications. The well-known LAPACK library contains block matrix algorithms implemented on top of the BLAS routines, and is written for good data reuse on a machine with a two-level memory hierarchy.

The LAPACK library has been successful in practice. However it requires a set of machine-specific, hand-coded BLAS routines to run well. Since it is not a general-purpose tool, it cannot be used outside the realm of dense numerical linear algebra. It is also specifically written for a two-level memory hierarchy, and it must be re-implemented for machines with deeper memory hierarchies. Therefore, automatic program restructuring tools that promote data reuse through transformations provide an attractive alternative.

An important transformation is Mike Wolfe's iteration space tiling, preceded by linear loop transformations if necessary. This approach is well documented in the art. However, this approach is restricted to perfectly nested loops, although it can be extended to imperfectly nested loops if they are first transformed into perfectly nested loops. A loop in a loop nest is said to carry reuse if the same data is touched by multiple iterations of that loop for fixed outer loop iterations. For example, loop K in code (i) carries reuse because for fixed I and J, all iterations of the loop touch C[I,J]; similarly, loop I carries reuse because successive iterations of the I loop touch B[K,J]. Loops that carry reuse are moved as far inside the loop nest as possible by using linear loop transformations; if two or more inner loops carry reuse and they are fully permutable, these loops are tiled. Intuitively, tiling improves performance by interleaving iterations of the tiled loops, which exploits data reuse in all those loops rather than in just the innermost one. It is easy to verify that all the three loops in the matrix multiplication code carry reuse and are fully permutable. Tiling all three loops produces the code shown below (for 25×25 tiles).

do t1=1..[(N/25)]
  do t2=1..[(N/25)]
    do t3=1..[(N/25)]
      do It=(t1−1)*25+1..min(t1*25,N)
        do Jt=(t2−1)25+1..min(t2*25,N)
          do Kt (t3−1)*25+1..min(t3*25,N)
            C[It,Jt]=C[It,Jt]+A[It,Kt]*B[Kt,Jt]

The three outer loops enumerate the iteration space tiles, while the three inner loops enumerate the iteration space points within a tile. In this case, iteration space tiling produces the same code as the equivalent block matrix code.

Tiling can be applied to imperfectly nested loops if these loops are converted to perfectly nested loops through the use of code sinking. Code sinking moves all statements into the innermost loop, inserting appropriate guards to ensure that these statements are executed the right number of times. There is no unique way to sink code in a given loop nest; for example, in left-looking Cholesky, statement S1 can be sunk into the I loop or into the L-K loop nest. Other choices arise from the possibility of doing imperfectly nested loop transformations (especially loop jamming) during the code sinking process. Depending on how these choices are made, one ends up with different perfectly nested loops, and the resulting programs after linear loop transformations and tiling may exhibit very different performance. In right-looking Cholesky for example, if S1 is sunk into the I loop, and the resulting loop is sunk into the L-K loop nest, the result is a 4-deep loop nest in which only the update loops can be tiled, even if linear loop transformations are performed on the perfectly nested loop. If on the other hand, the I and L loops are -jammed together, and then sunk, a fully permutable loop nest results; tiling this loop nest produces code with much better performance. Similarly, it can be shown that for left-looking Cholesky, the best sequence of transformations is first to sink S1 into the I loop, jam the I and L loops together and then sink S1 and S2 into K loop. Interactions between loop jamming/distribution and linear loop transformations have been studied in the prior art. However, no systematic procedure for exploring these options for obtaining perfectly nested loops from imperfectly nested loops is known.

Others have investigated compiler blockability of numerical algorithms. By doing a detailed study of matrix factorization codes in the LAPACK library, a list of transformations have been compiled that must be performed to get code competitive with LAPACK code. These include strip-mine-and-interchange, preceded by index-set-splitting and loop distribution to make the interchange legal. Additional transformations such as unroll-and-jam and scalar replacement are performed on this code to obtain code competitive with hand-blocked codes. However, these investigations discover no way of finding automatically the right sequence of transformations to perform. Nor is there a generalized approach for a machine with a multi-level memory hierarchy.

Data-centric Transformations

Since program transformation to enhance data reuse and reduce data movement through the memory hierarchy is an object of this invention, it would be advantageous to have a tool that orchestrates data movement directly, rather than as a side-effect of control flow manipulations. The ultimate result of the orchestration is, of course, a transformed program with the desired data reuse, but to get that program, the tool would reason directly about the desired data flow rather than about the control flow of the program. A useful analogy is signal processing. The input and the output of signal processing is a signal that varies with time, and in principle. all processing can be done in the time domain. However, it is often more convenient to take a Fourier Transform of the signal, work in the frequency domain and then take an inverse Fourier Transform back into the time domain.

Data Shackle

In the remainder of this description, the phrase statement instance refers to the execution of a statement for given values of index variables of loops surrounding that statement.

A data shackle mechanism can be specified as follows:.
(1) choose a data object and divide it into blocks;
(2) determine a sequence in which these blocks are "touched" by the processor;
(3) for each block, determine a set of statement instances to be performed when that block is touched by the processor, however, leave unspecified the order of enumeration of statement instances within this set. (Note, one possible order for executing these statement instances is to use the same order as the initial code. Leaving the order unspecified permits the joining of data shackles together to get finer degrees of control on the execution.)

Figure 3:
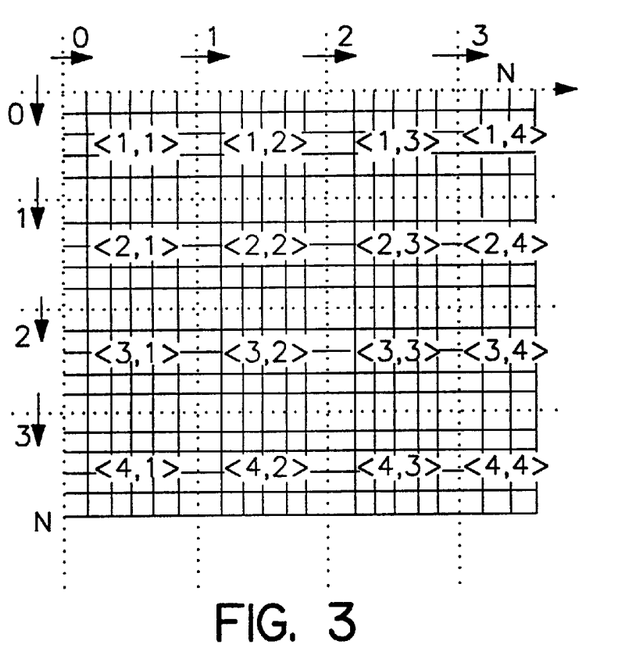
FIG. 3 represents cutting planes on a data object.

The data objects of interest to us are multidimensional arrays. An array can be sliced into blocks by using a set of parallel cutting planes with normal n, separated by a constant distance d. Further slicing can be performed by using additional sets of planes inclined with respect to this set of planes. The cutting planes matrix is defined as the matrix whose columns are the normals to the different sets of cutting planes; the order of these columns is determined by the order in which the sets of cutting planes are applied to block the data. FIG. 3 shows the blocking of a two-dimensional array with two sets of cutting planes; the cutting planes matrix is:

$$\begin{vmatrix} 1 & 0 \\ 0 & 1 \end{vmatrix}$$

A block is assigned the block co-ordinate $(X_1, \ldots, X_m)$ if it is bounded by cutting planes numbered $x_i - - - 1$ and $x_1$ from the $i^{th}$ set of cutting planes. The code that we generate 'schedules' blocks by enumerating them in lexicographic order of block co-ordinates.

The final step is to specify the statement instances that should be performed when a block is scheduled. From each statement S, a single reference R is chosen of the array that is being blocked. For now, assume that a reference to this array appears in every statement. This condition will be relaxed in the manner described further in the description of the invention. When a block of data is scheduled, all instances of S are executed for which the data touched by reference R is contained in this block. Because of other data references in statement S, these statement instances may touch data outside that block. As mentioned before, the order in which these instances should be done is left unspecified.

The rationale for the term "data shackle" should now be clear. One thinks of an instrument like a pantograph in which a master device visits the blocks of data in lexicographic order, while a slave device shackled to it is dragged along some trajectory in the iteration space of the program. It is also convenient to be able to refer to statement instances "shackled" to a particular block of data. Since a data shackle reorders computations, it is necessary to check that the resulting code respects dependences in the original program. Legality can be checked using standard techniques from polyhedral algebra, and is discussed below.

As an example of a data shackle, consider the matrix multiplication code of (i). Let us block matrix C as shown in FIG. 3 of the drawings, using a block size of 25×25, and shackle the reference C[I,J] in code (i) to this blocking. This data shackle requires that when a particular block of C is scheduled, all statement instances that write into this block of data must be performed by the processor. We can require these to be performed in program order of the source program. Naive code for accomplishing this is shown below.

```
do b1=1..[(N/25)]
do b2=1..[(N/25)]
   do I=1.. N
     do J=i .. N
        do K=1.. N
          if ((b1-1)*25<I<=b1*25) &&
             ((b2-1)*25<J<=b2*25)
             C[I,J]=C[I,J]+A[I,K]*B[K,J]
```

Naive Code Produced By Blocking C For Matrix Matrix Multiply

The two outer loops iterate over the blocks of C. For every block of C, the entire original iteration space is visited and every iteration is examined to see if it should be executed. If the location of C accessed by the iteration falls in the current block (which is determined by the conditional in the code), that iteration is executed. It is easy to see that in the presence of affine references, the conditionals are all affine conditions on the loop indices corresponding to the cutting plane sets and the initial loop index variables.

Figure 4:
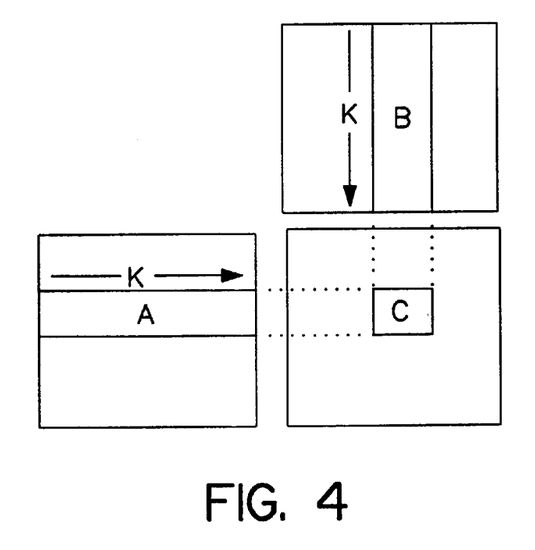
FIG. 4 represents a pictorial representation of a blocking structure.

The above Naive Code is not very efficient, and is similar to runtime resolution code generated when shared-memory programs are compiled for distributed-memory machines. Fortunately, since the conditions are affine conditions on surrounding loop bounds, they can be simplified using any polyhedral algebra tool. The Omega calculator is used to produce code (iv) set forth below:

```
do c1=1, N/25
do c2=1, N/25
   do i=25*c1-24, min(25*c1, N)
     do j=25*c2-24, min(25*c2, N)
        do k=1, N
          C[i,i]=C[i,j]+A[i,k]*B[k,j]
``` with the blocking structure depicted in FIG. 4 of the drawings.(Note: the preceding terms are terms well known in the art) It is simple to verify that this code has the desired effect of blocking the C array since blocks of C are computed at a time by taking the product of a block row of A and a block column of B. This code is not the same as the code for matrix matrix product in the BLAS library used by LAPACK since the block row/column of A/B are not blocked themselves. Our data shackle constrains the values of the loop indices I and J in FIG. 1A, but leaves the values of K unconstrained. This problem is addressed later in the description where it is discussed how data shackles can be combined.

In the Cholesky factorization code, array A can be blocked in a manner similar to FIG. 3. When a block is scheduled, it is chosen to perform all statement instances that write to that block (in program order). In other words, the reference chosen from each statement of the loop nest is the left hand side reference in that statement. Using polyhedral algebra tools, we obtain code (v) set forth below.

```
do t1=1, (n+63)/64
/* Apply updates from left to diagonal block */
do t3=1, 64*t1-64
   do t6=64*t1-63, min(n,64*t1)
     do t7=t6, min(n,64*t1)
        A(t7,t6)=A(t7,t6)-A(t7,t3)*A(t6,t3)
/* Cholesky factor diagonal block */
do t3=64*t1-63, min(64*t1,n)
   A(t3,t3)=sqrt(A(t3, t3))
   do t5=t3+1, min(64*t1,n)
      A(t5,t3)=A(t5,t3)/A(t3,t3)
do t6=t3+1, min(n,64*t1)
   do t7=t6, min(n,64*t1)
      A(t7,t6)=A(t7,t6)-A(t7,t3)*A(t6,t3)
do t2=t1+1, (n+63)/64
/* Apply updates from left to
off-diagonal block */
do t3=1, 64*t1-64
   do t6=64*t1-63, 64*t1
      do t7=64*t2-63, min(n,64*t2)
         A(t7,t6)=A(t7,t6)-A(t7,t3)*A(t6,t3)
/* Apply internal scale/updates to
      off-diagonal block */
do t3=64*t1-63, 64*t1
do t5=64*t2-63, min(64*t2,n)
     A(t5,t3)=A(t5,t3)/A(t3,t3)
do t6=t3+1, 64*t1
do t7=64*t2-63, min(n,64*t2)
     A(t7,t6)=A(t7,t6)-A(t7,t3)*A(t6,t3)
```

Figure 2A:
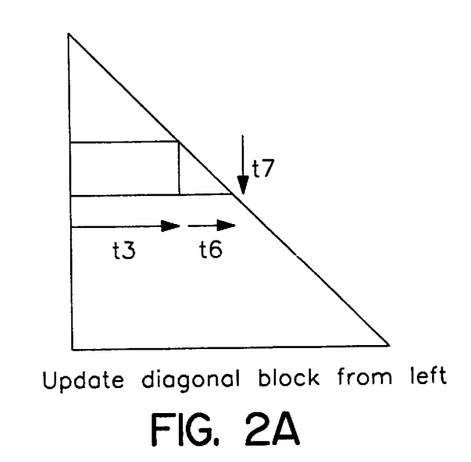
FIGS. 2A and 2B are pictorial views of Cholesky factorization, FIG. 2A being an update diagonal block from the left and FIG. 2B being a Cholesky factor diagonal block.
Figure 2B:
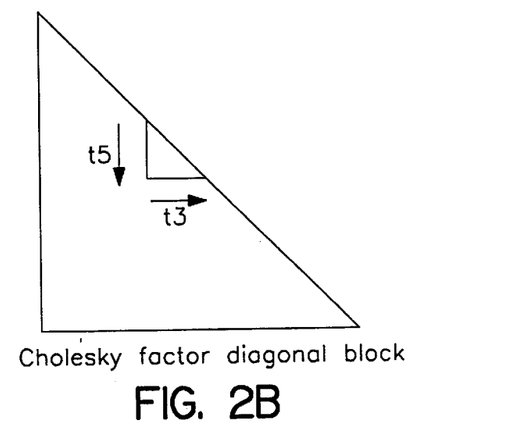
Figure 2C:
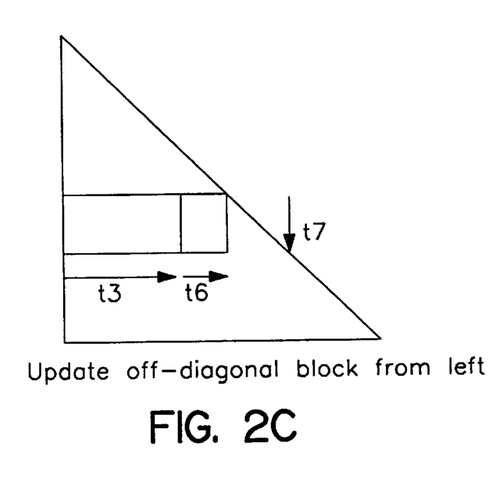
FIGS. 2C and 2D are pictorial views of the code of FIGS. 2A and 2B, FIG. 2C being an update off-diagonal block from the left and FIG. 2B being an internal scale+update.
Figure 2D:
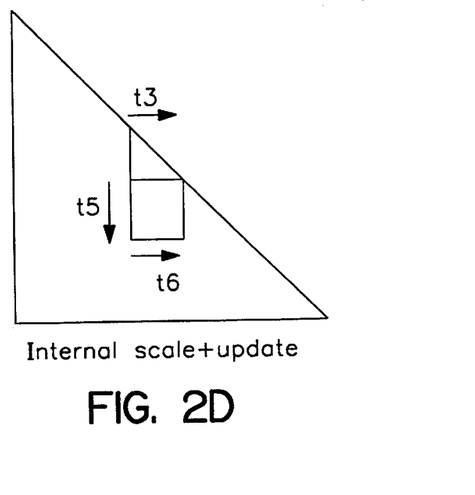

In this code, data shackling regroups the iteration space into four sections as shown in FIGS. 2A, 2B, 2C and 2D of the drawings. Initially, all updates to the diagonal block from the left are performed (FIG. 2A), followed by a "baby Cholesky factorization" of the diagonal block (FIG. 2B). For each off-diagonal block, updates from the left (FIG. 2C) are followed by interleaved scaling of the columns of the block by the diagonal block, and local updates (FIG. 2D).

Note that just as in the case of matrix matrix product, this code is only partially blocked (compared to LAPACK code)—although all the writes are performed into a block when we visit it, the reads are not localized to blocks. Instead, the reads are distributed over the entire left portion of the matrix. As before, this problem is solved in the section on products of shackles.

By shackling a data reference R in a source program statement S, we ensure that the memory access made from that data reference at any point in program execution will be constrained to the "current" data block. Turning this around, when a block becomes current, all instances of statement S for which the reference R accesses data in that block are performed. Therefore, this reference enjoys perfect self-temporal locality. Considering all shackled references together, shows perfect group-temporal locality for this set of references; of course, references outside this set array do not necessarily enjoy group-temporal locality with respect to this set. As mentioned earlier, no particular order is mandated in which the data points within a block are visited. However, if all dimensions of the array are blocked and the block fits in cache (or whatever level of the memory hierarchy is under consideration), we obviously exploit spatial locality, regardless of whether the array is stored in column-major or row-major order. An interesting observation is that if stride-1 accesses are mandated for a particular reference, we can simply use cutting planes with unit separation which enumerate the elements of the array in storage order. Enforcing stride-1 accesses within the blocks of a particular blocking can be accomplished by combining shackles as described below. The code (v) can certainly be obtained by a (long) sequence of traditional iteration space transformations like sinking, tiling, index-set splitting, distribution, etc. As we discussed in the introduction, it is not clear for imperfectly nested loops in general how a compiler determines which transformations to carry out and in what sequence these transformations should be performed. In this regard, it is important to understand the "division of work" between our data-centric transformation of the present invention and a polyhedral algebra tool like Omega. Enforcing a desired pattern of data accesses is obtained by choosing the right data shackle that the pattern of array accesses made by the code shown above, which is obtained directly from the specification of the data shackle without any use of polyhedral algebra tools, is identical to the pattern of array accesses made by the simplified code set forth above. The role of polyhedral algebra tools in our approach is merely to simplify programs, as opposed to producing programs with desired patterns of data accesses.

Legality

Since data shackling reorders statement instances, it is necessary to ensure that it does not violate dependences. An instance of a statement S can be identified by a vector i which specifies the values of the index variables of the loops surrounding S. The tuple (S, i) represents instance i of statement S. Suppose there is a dependence from (S1, i1) to (S2, i2) and suppose that these two instances are executed when blocks $b_1$ and $b_2$ are touched respectively. For the data shackle to be legal, either $b_1$ and $b_2$ must be identical, or b, must be touched before b2. If so, the data shackle respects that dependence. A data shackle is legal if it respects all dependences in the program. Since the techniques of this invention apply to imperfectly nested loops like Cholesky factorization, it is not possible to use dependence abstractions like distance and direction to verify legality. Instead, an integer linear programming problem is solved.

Descriptive Example

For example to understand the general algorithm, it is useful to consider first a simple example: in right-looking Cholesky factorization, the problem is formulated of ensuring that the flow dependence from the assignment of A[J,J] in S1 to the use of A[J,J] in S2 is respected by the data shackle from which the program, code (v) was generated. The shackle was produced by blocking the matrix A as shown in FIG. 3, and choosing the left hand side references of all assignment statements in code (ii) for shackling. First it is necessary to write down a set of integer inequalities that represent the existence of a flow dependence between an instance of SI and an instance of S2. Let S1 write to an array location in iteration Jw of the J loop, and let S2 read from that location in iteration $(J_r, I_r)$ of the J and I loops. A flow dependence exists if the following linear inequalities have an integer solution:

$$\begin{cases} J_r = J_w, I_r = J_w & \text{(same location)} \\ N \geq J_w \geq 1 & \text{(loop bounds)} \\ N \geq J_r \geq 1 & \text{(loop bounds)} \\ N \geq I_r \geq J_r + 1 & \text{(loop bounds)} \\ J_r \geq J_w & \text{(read after write)} \end{cases} \quad (1)$$

Next, assume that the instance of S2 is performed when a block $(b_{11}, b_{12})$ is scheduled, and the instance of S1 is done when block $(b_{21}, b_{22})$ is scheduled. Finally, a condition is added that represents the condition that the dependence is violated in the transformed code. In other words, a condition is put in which states that block $(b_{11}, b12)$ is "touched" strictly after $(b_{21}, b_{22})$. These conditions are represented as:

$$\begin{cases} \text{Writing iteration done in } (b_{11}, b_{12}) \\ b_{11} * 25 - 24 \leq J_w \leq b_{12} * 25 \\ b_{12} * 25 - 24 \leq J_w \leq b_{12} * 25 \\ \text{Reading iteration done in } (b_{21}, b_{22}) \\ b_{21} * 25 - 24 \leq J_r \leq b_{21} * 25 \\ b_{22} * 25 - 24 \leq I_r \leq b_{22} * 25 \\ \text{Blocks visited in bad order} \\ (b_{11} < b_{21}) \vee ((b_{11} = b_{21}) \wedge (b_{12} < b_{22})) \end{cases} \quad (2)$$

If the conjunction of the two sets of conditions (1) and (2) has an integer solution, it means that there is a dependence, and that dependent instances are performed in the wrong order. Therefore, if the conjunction has an integer solution, the data shackle violates the dependence and is not legal. This problem can be viewed geometrically as asking whether a union of certain polyhedra contains an integer point, and can be solved using standard polyhedral algebra.

This test can be performed for each dependence in the program. If no dependences are violated, the data shackle is legal.

General View of Legal Data Shackles

Figure 5:
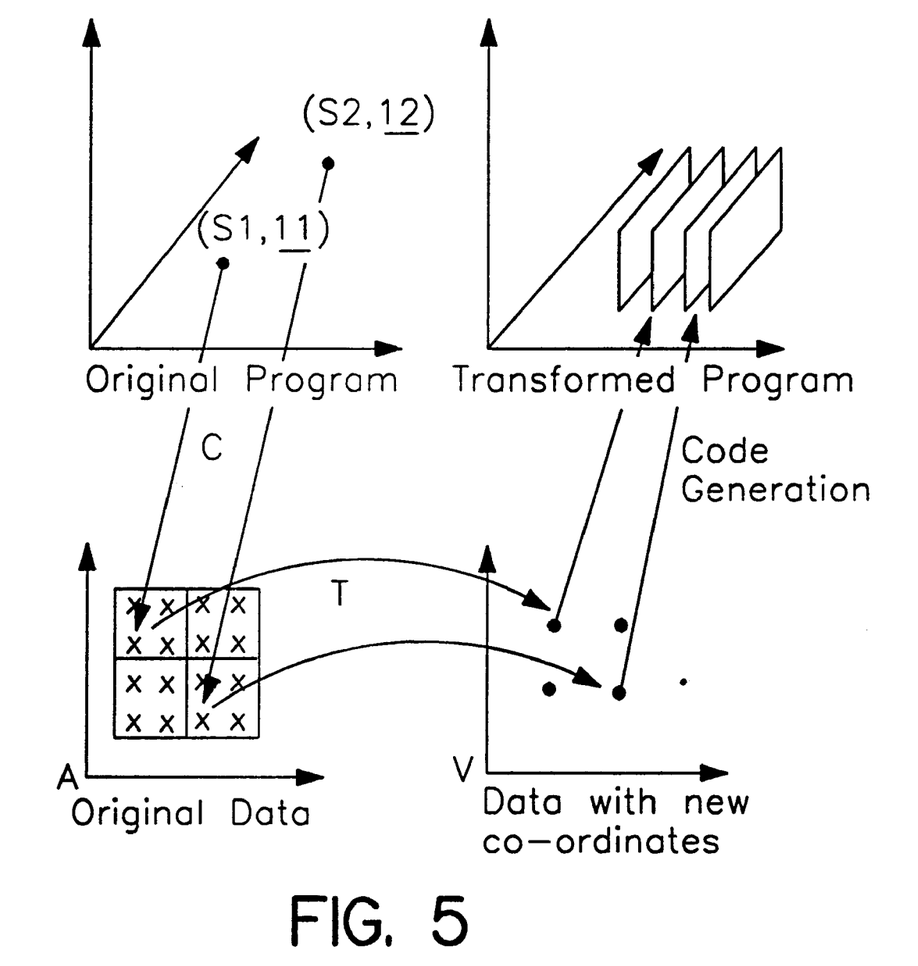
FIG. 5 represents testing for legality.

The formulation of the general problem of testing for legality of a data shackle becomes simpler if first the notion of blocking data is generalized. A data blocking, such as the one shown in FIG. 3, can be viewed simply as a map that assigns co-ordinates in some new space to every data element in the array. For example, if the block size in this figure is 25×25, array element $(a_1, a_2)$ is mapped to the co-ordinate $((a_1 \text{ div } 25)+1, (a_2 \text{ div } 25)+1)$ in a new two-dimensional space. Note that this map is not one-to-one. The bottom part of FIG. 5 shows such a map pictorially. The new space is totally ordered under lexicographic ordering. The data shackle can be viewed as traversing the remapped data in lexicographic order in the new co-ordinates; when it visits a point in the new spece, all statement instances mapped to that point are performed.

Therefore, a data shackle can be viewed as a function M that maps statement instances to a totally ordered set (V, α). For the blocking shown in FIG. 5, C: (S,I) →A maps statement instances to elements of array A through data-centric references, and T:A →V maps array elements to block co-ordinates. Concise-Ly, M=ToC. Given a function M:(S,I)→(v, α), the transformed code is obtained by traversing V in increasing order, and for each element v ∈V, executing the statement instances $M^{-1}$ (v) in program order in the original program.

Theorem 1–A map M: (S,I)→V, α) generates legal code if the following condition is satisfied for every pair of dependent statements S1 and S2.
  a) Introduce vectors of unknowns i1 and i2 that represent instances of dependent statements S1 and S2 respectively.
  b) Formulate the inequalities that must be satisfied for a dependence to exist from instance i1 of statement S1 to instance i2 of statement S2. This is standard.
  c) Formulate the predicate M (S2, i2) M (S1, i1).
  d) The conjunction of these conditions does not have an integer solution.

Viewing blocking as a remapping of data co-ordinates simplifies the development of the legality test. This remapping is merely an abstract mathematical device to enforce a desired order of traversal through the array; the physical array itself is not necessarily reshaped. For example, in the blocked matrix multiplication code in FIG. 4 of the drawings, array C need not be laid out in "block" order to obtain the benefits of shackling this array. This is similar to the situation in BLAS/LAPACK where it is assumed that the FORTRAN column-major order is used to store arrays. Of course, nothing prevents us from reshaping the physical data array if the cost of converting back and forth from a standard representation is tolerable. Up to this point, it is assumed that every statement in the program contains a reference to the array being blocked by the data shackle. Although this assumption in valid for kernels like matrix multiplication and Cholesky factorization, it is obviously not true in general programs. The present approach to this problem is simplified. If a statement does not contain a reference to the array being blocked by the data shackle, a dummy reference is added to that array (such as +0*B [I,J]) to the right hand side of the statement. The dummy reference is of course irrelevant for dependence analysis, and serves only to determine which instances of this statement are performed when elements of B are touched by the data shackle. A data shackle that is illegal for one choice of this expression may be legal if some other expression is used.

Products of Shackles

Next it is shown that there is a natural notion of taking the Cartesian product of a set of shackles. The motivation for this operation comes from the matrix multiplication code of FIG. 4, in which an entire block row of A is multiplied with a block of column of B to produce a block of C. The order in which the iterations of this computation are done is left unspecified by the data shackle. The shackle on reference C[I,J] constrains both I and J. but leaves K unconstrained; therefore, the references A[I,K] and B[K,J] can touch an unbounded amount of data in arbitrary ways during the execution of the iterations shackled to a block of C[I, J] ). Instead of C, we can block A or B, but this still results in unconstrained references to the other two arrays. To get LAPACK-style blocked matrix multiplication, we need to block all three arrays. This effect can be achieved by taking Cartesian products.

Informally, the notion of taking the Cartesian product of two shackles can be viewed as follows. The first shackle partitions the statement instances of the original program, and imposes an order on these partitions. However, it does not mandate an order in which the statement instances in a given partition should be performed. The second shackle refines each of these partitions separately into smaller, ordered partitions, without reordering statement instances across different partitions of the first shackle. In other words, if two statement instances are ordered by the first shackle, they are not reordered by the second shackle. The notion of a binary Cartesian product can be extended the usual way to an n- ary Cartesian product; each extra factor in the Cartesian product gives us finer control over the granularity of data accesses.

A formal definition of the Cartesian product of data shackles is the following. Recall from the discussion in the section on general view of data shackles that a data shackle for a program P can be viewed as a map M:(S,I)→V, whose domain is the set of statement instances and whose range is a totally ordered set.

Definition 2 For any program P, let $$M_1: (S, I) \to V_1$$
$$M_2: (S, I) \to V_2$$

be two data shackles. The Cartesian product $M_1 \times M_2$ of these shackles is defined as the map whose domain is the set of statement instances, whose range is the Cartesian product $V_1 \times V_2$ and whose values are defined as follows: for any statement instance (S, i).

$$(M_1 \times M_2)(S,i) = <M_1(S, i), M_2(S,i)>$$

The product domain $V_1 \times V_2$ of two totally ordered sets is itself a totally ordered set under standard lexicographic order. Therefore, the code generation strategy and associated legality condition are identical to those provided above. It is easy to see that for each point $v_1 \times v_2$ in the product domain $V_1 \times V_2$, we perform the statement instances in the set $(M_1 \times M_2)^{-1} (v_1, v_2) = M_1^{-1} (v_1) \cap M_2^{-1} (v_2)$. In the implementation, each term in an n-ary Cartesian product contributes a guard around each statement. The conjunction of these guards determines which statement instances are performed at each step of execution. Therefore, these guards still consist of conjuncts of affine constraints. As with single date shackles, the guards can be simplified using any polyhedral algebra tool.

Note that the product of two shackles is always legal if the two shackles are legal by themselves. However, a product $M_1 \times M_2$ can be legal even if $M_2$ by itself is illegal. This is analogous to the situation in loop nests where a loop nest may be legal even if there is an inner loop that cannot be moved to the outermost position; the outer loop in the loop nest "carries" the dependence that causes difficulty for the inner loop.

In matrix multiplication, it is easy to see that shackling any of the three references (C[I, J], A[I, K], B[K, J]) to the appropriate blocked array is legal. Therefore, all Cartesian products of these shackles are also legal. The Cartesian product $M_C \times M_A$ of the C and A shackles produces the code shown earlier in the description. It is interesting to note that further shackling with the B shackle (that is the product $M_C \times M_A \times M_B$) does not change the code that is produced. This is because shackling C[I, J] to the blocks of C and shackling A[I, K] to blocks of A imposes constraints on the reference B[K, J] as well. A similar effect can be achieved by shackling the references C[I, J] and B[K, J], or A[I, K] and B[K, J].

A more interesting example is the Cholesky code. In (ii), it is easy to verify that there are six ways to shackle references in the source program to blocks of the matrix (choosing A[J, J] from statement S1, either A[I, J] or A[J, J] from statement S2 and either A[L,K], A [L, J] or A[K, J] from statement S3). Of these, only two are legal: choosing A[J, J] from S1, A[I,J] from S2 and A[L,K] from S3, or choosing A[J,J] from S1, A[I,J] from S2 and A[L,J] from S3. The first shackle chooses references that write to the block, while the second shackle chooses references that read from the block. Since both these Dhackles are legal, their Cartesian product (in either order) is legal. It can be shown that one order gives a fully-blocked left-looking Cholesky, identical to the blocked Cholesky algorithm, while the other order gives a fully-blocked right-looking Cholesky.

For example a Cholesky factorization compiled by SGI's FORTRAN compiler, which uses tiling and other control-centric transformations, obtained 50 MFlops; while this data-centric approach obtained 175 MFlops.

Taking the Cartesian product of data shackles provides finer control over data accesses in the blocked code. As discussed earlier, shackling just one reference in matrix multiplication (say C[I,J]) does not constrain all the data accesses. On the other hand, shackling all three references in this code is over-kill since shackling any two references constraints the third automatically. Taking a larger Cartesian product than is necessary does not affect the correctness of the code but it introduces unnecessary loops into the resulting code which must be optimized away by the code generation process to get good code. The following obvious result is useful to determine how far to carry the process of taking Cartesian products. It is assumed that all array access functions are linear functions of loop variables (if the functions are affine, we drop the constant terms); if so, they can be written as $F*\underline{I}$ where F is the data access matrix and $\underline{I}$ is the vector of iteration space variables of loops surrounding this data reference.

Theorem 2: For a given statement S, let $F_1, \ldots, F_n$ be the access matrices for the shackled data references in this statement. Let $F_{n+1}$ be the access matrix for an unshackled reference in S. Assume that the data accessed by the shackled references are bounded by block size parameters. Then the data accessed by $F_{n+1}$ is bounded by block size parameters if every row of $F_{n+1}$ is spanned by the rows of $F_1, \ldots, F_n$.

Stronger versions of this result can be proved, but it suffices for our purpose in this paper. For example, the access matrix for the reference C[I, J] is $$\begin{vmatrix} 1 & 0 & 0 \\ 0 & 1 & 0 \end{vmatrix}$$

Shackling this reference does not bound the data accessed by row [0 0 1] of the access matrix $$\begin{vmatrix} 0 & 0 & 1 \\ 0 & 1 & 0 \end{vmatrix}$$

of reference B[K, J]. However, taking the Cartesian product of this shackle with the shackle obtained from A[I ,K] constrains the data accessed by B[K, J], because all rows of the corresponding access matrix are spanned by the set of rows from the access matrices of C[I,J] and A[I,K].

Cartesian products of shackles is a way of generating new shackles from old ones. The invention provided herein provides a basis for generating good data shackles. For example:

a) How are the data-centric references chosen? For each statement, the data-centric references should be chosen such that there are no remaining unconstrained references.

b) How big should the Cartesian products be? If there is no statement left which has an unconstrained reference, then there is no benefit to be obtained from extending the product.

c) What is a correct choice for orientation of cutting planes? To a first order of approximation, the orientation of the cutting planes is irrelevant as far as performance is concerned, provided the blocks have the same volume. Of course, orientation is import-ant for legality of the data shackle.

Multi-level Blocking

Cartesian products can be used in an interesting manner to block programs for multiple levels of memory hierarchy. For purposes of brevity, only the high level idea is set forth here. For a multi-level memory hierarchy, a Cartesian product of products of shackles where each factor in the outer Cartesian product determines blocking for one level of the memory hierarchy is generated.

The first term in the outer Cartesian product corresponds to blocking for the slowest (and largest) level of the memory hierarchy and corresponds to largest block size. Subsequent terms correspond to blocking for faster (and usually smaller) levels of the memory hierarchy. This process has been applied to obtain multiply blocked versions of our running examples in a straightforward fashion. The following code demonstrates this process for matrix multiplication.

```
do t1=1, (n+63)/64
 do t2=1, (n+63)/64
  do t3=1, (n+63)/64
   do t7=8*t1-7, min(8*t1,(n+7)/8)
    do t8=8*t2-7, min(8*t2,(n+7)/8)
     do t9=8*t3-7, min(8*t3,(n+7)/8)
      do t13=8*t9-7, min(n,8*t9)
       do t14=8*t8-7, min(n,8*t8)
        do t15=8*t7-7, min(8*t7,n)
         C[t13,t14]+=A[t13,t15]*B[t15, t14]
```

The outer Cartesian product for this example has two factors: the first factor is itself a product of two shackles (on C[I, J] and A[I,K] with block sizes of 64), and the second factor is also a product of two shackles (once again, on C[I,J] and A[I,K], but block sizes of 8). As can be seen from the code, the first term of the outer Cartesian product performs a 64-by-64 matrix multiplication, which is broken down into several 8-by-8 matrix multiplications by the second term in this product. By choosing smaller inner blocks (like 2-by-2) and unrolling the resulting loops, we can block for registers.

Examples demonstrating the performance enhancement of the present invention are provided below:

Performance results are presented below on a thin node of the IBM SP-2 for the following applications: ordinary and banded Cholesky factorizations, QR factorization, the ADI kernel and the GMTRY benchmark from the NAS suite. All compiler generated codes were compiled on the SP-2 using xlf-0.3.

Figure 6A:
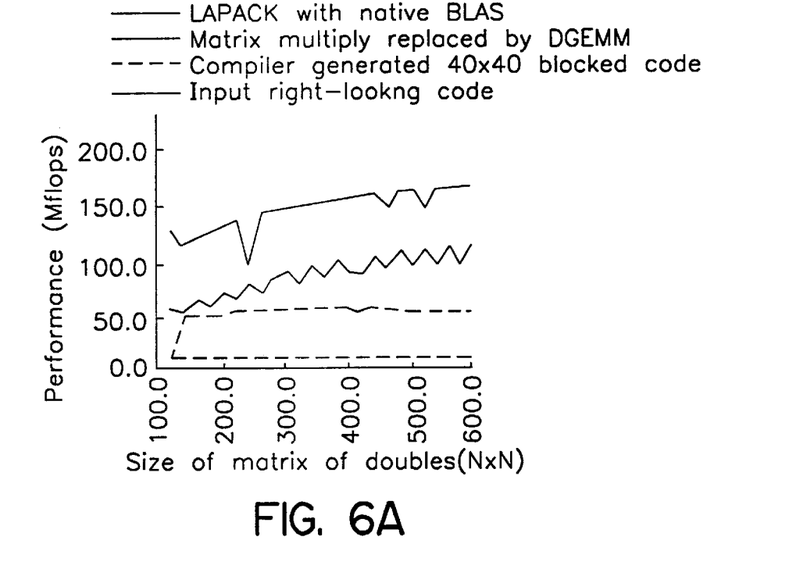
FIGS. 6A and 6B represent Cholesky factorization on the IBM SP-2.
Figure 6B:
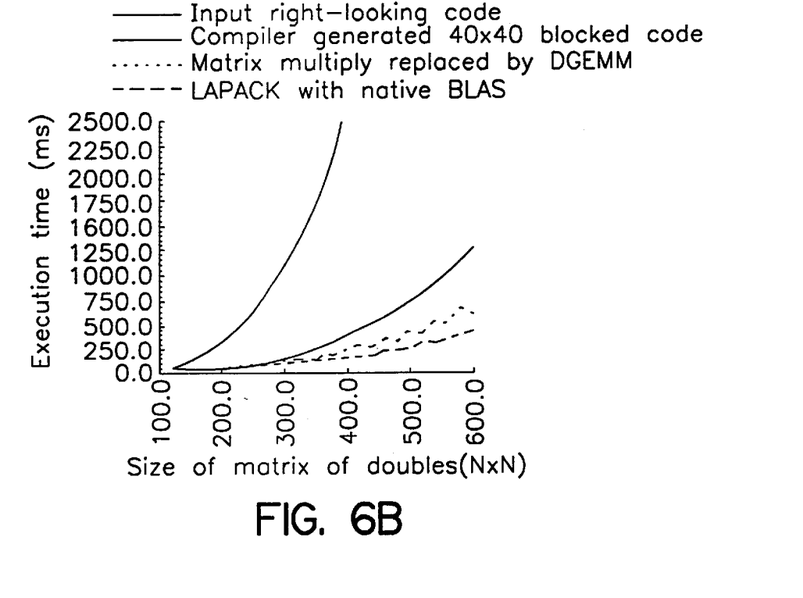

FIGS. 6A and 6B show the performance of Cholesky factorization. The lines labeled Input right-looking code show the performance of the right-looking Cholesky factorization code in FIG. 1B. This code runs at roughly 8 Mflops. The lines labeled Compiler generated code show the performance of the fully blocked left-looking Cholesky code produced by the Cartesian product of data shackles discussed above. While there is a dramatic improvement in performance from the initial code, this blocked code still does not get close to peak performance because the compiler back-end does not perform necessary optimizations like scalar replacement in innermost loops. A large portion of execution time is spent in a few lines of code which implement matrix multiplication, but which are optimized poorly by the IBM compiler. Replacing these lines manually by a call to the ESSL BLAS-3 matrix multiplication routine improves performance considerably, as is shown by the lines labeled Matrix Multiply replaced by DGEMM. Finally, the line labeled LAPACK with native BLAS is the performance of the Cholesky factorization routine in LAPACK running on the native BLAS routines in ESSL. The MFlops graph provides "truth in advertising"—although the execution times of LAPACK and compiler-generated code with DGEMM are comparable, LAPACK achieves higher Mflops. This is because we replaced only one of several matrix multiplications in the blocked code by a call to DGEMM. On the positive side, these results, coupled with careful analysis of the compiler-generated code, show that the compiler-generated code has the right block structure. The remaining task is to make the compilation of the inner loops (by unrolling the inner loops, prefetching data and doing scalar replacement) more effective in the IBM compiler.

Figure 7A:
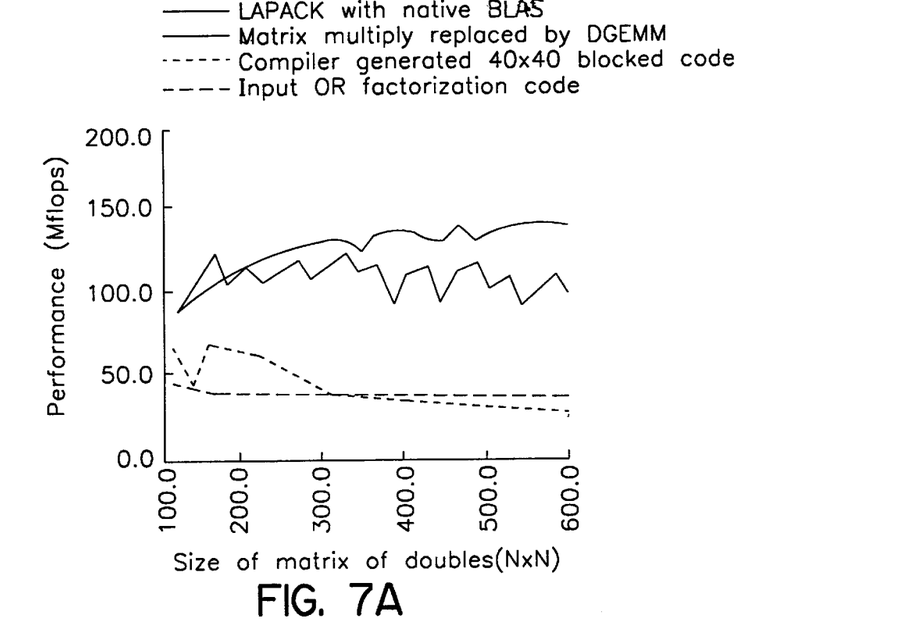
FIGS. 7A and 7B represent QR factorization on the IBM SP-2.
Figure 7B:
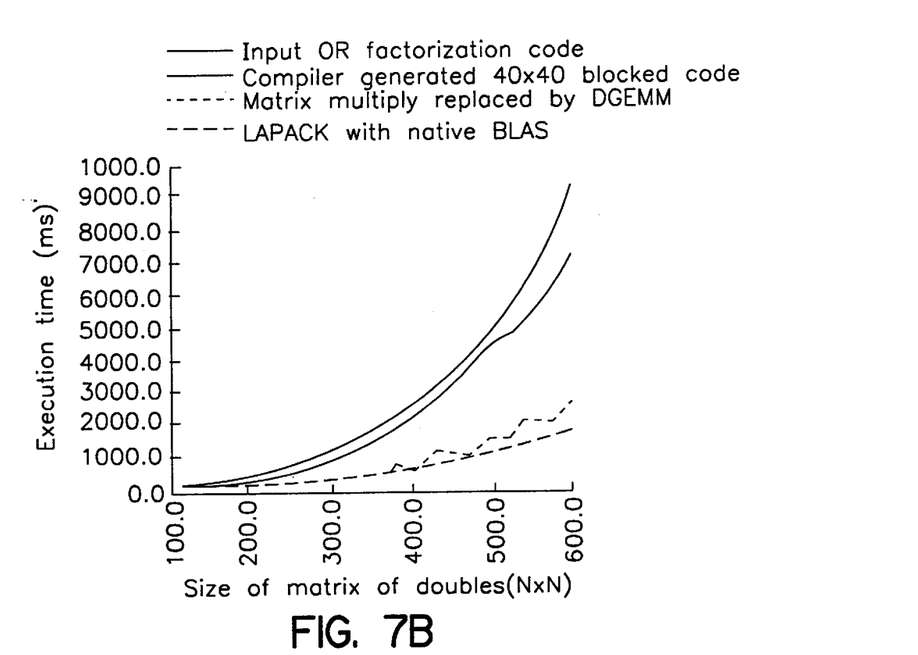
Figure 8A:
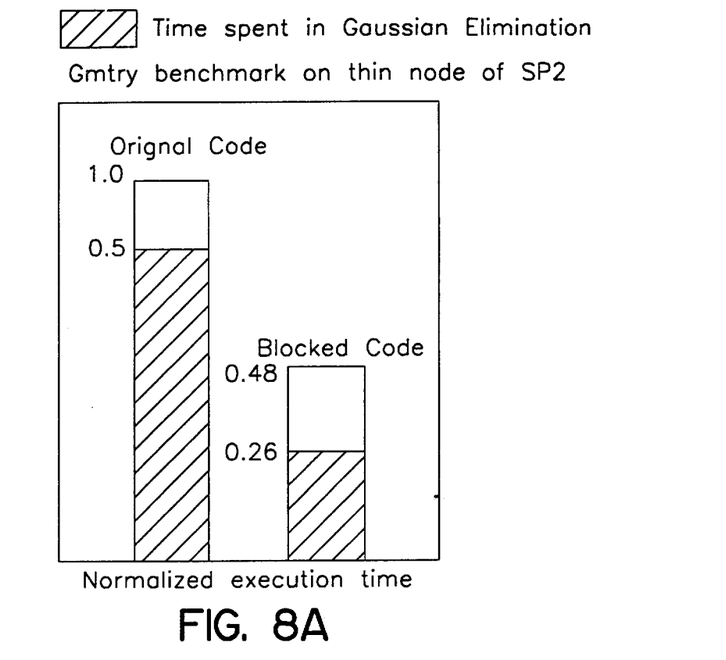
FIGS. 8A and 8B represent Gmtry and ADI benchmarks on the IBM SP-2.

FIGS. 7A and 7B show the performance of QR factorization using Householder reflections. The input code has poor performance, and it is improved somewhat by blocking. The blocked code weas generated by blocking only columns of the matrix, since dependences prevent complete two-dimensional blocking of the array being factored. As in the case of Cholesky factorization, replacing loops that perform matrix multiplication with calls to DGEMM results in significant improvement, as shown by the line labeled Matrix Multiply replaced by DGEMM. This code beats the fully blocked code in LAPACK for matrices smaller than 200-by-200. The compiler-generated code uses the same algorithm as the "pointwise" algorithm for this problem; the LAPACK code on the other hand uses domain-specific information about the associativity of Householder reflections to generate a fully-blocked version of this algorithm. FIG. 8A shows the results of data shackling for the Gmtry kernel which is a SPEC benchmark kernel from Dnasa 7. This code performs Gaussian elimination across rows, without pivoting. Data shackling blocked the array in both dimensions, and produced code similar to what we obtained in Cholesky factorization. As can be seen in this figure, Gaussian elimination itself was speeded up by a factor of 3; the entire benchmark was speeded up by a factor of 2.

The code set forth below shows the ADI kernel used by McKinley et al in their study of locality improving transformations.

Input Code
```
do i=2, n
  do k=1, n
S1: X(i,k)-=X(i-1,k)*A(i,k)/B(i-1,k)
  enddo
  do k=1, n
S2: B(i, k)-=A(i,k)*A(i,k)/B(i-1,k)
  enddo
enddo
```

This code was produced from FORTRAN-90 by a scalarizer. The traditional iteration-centric approach to obtain good locality in this code is to fuse the two k loops first, after which the outer i loop and the fused k loop are interchanged to obtain unit-stride accesses in the inner loop. The resulting code is shown below.

Transformed Code
```
do t1=1, n
  do t2=1, n-1
S1: X(t2+1,t1)-=X(t2,ti)*A(t2+1,t1)/B(t2,t1)
S2: B(t2+1,t1)-=A(t2+1,t1)*A(t2+1,t1)/B(t2,t1)
  enddo
enddo
```

Figure 8B:
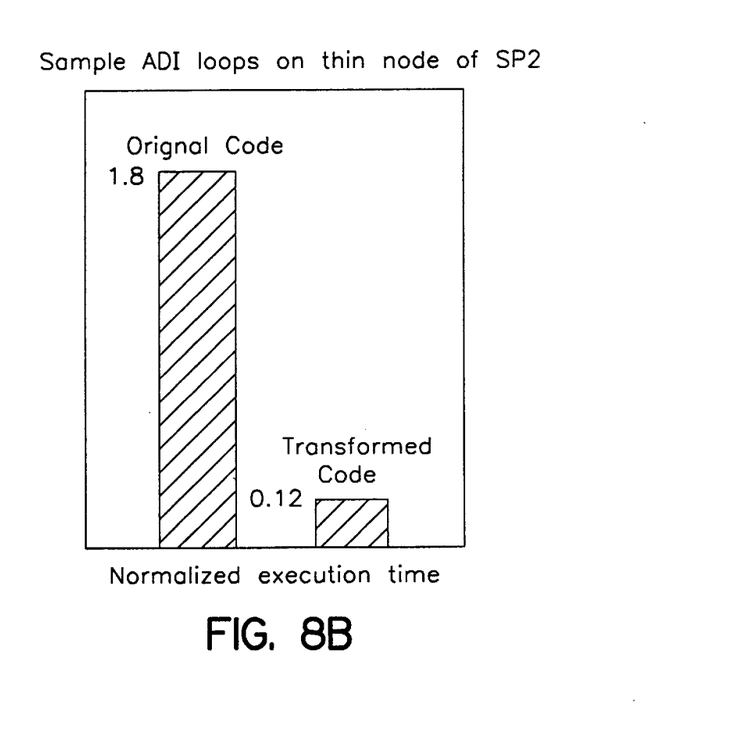

In the approach set forth in this invention, this final code is obtained by simply choosing B(i−1,k) as the data-centric reference in both S1 and S2 and blocking B into blocks of size 1×1. When an element of B is touched, all statement instances from both loop nests that touch this element must be performed; this achieves the effect of loop jamming. Traversing the blocks in storage order achieves perfect spatial locality, which achieves the effect of loop interchange after jamming. As shown in FIG. 8B, the transformed code runs 8.9 times faster than the input code, when n is 1000.

Figure 9:
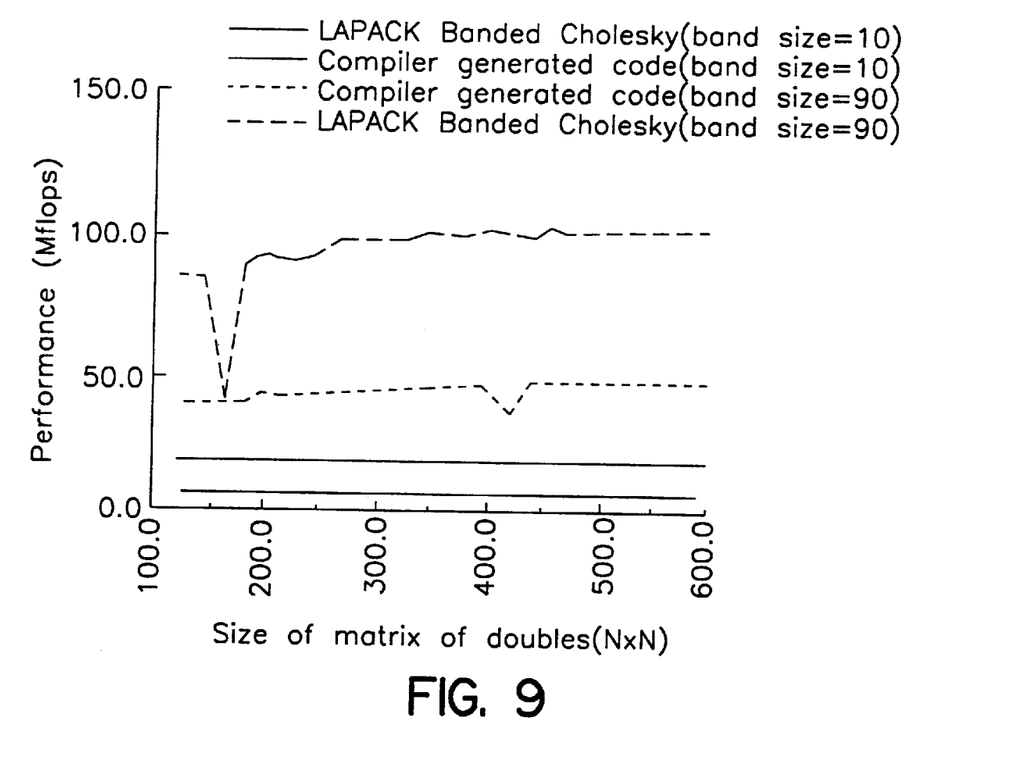
FIG. 9 represents a branded Cholesky factorization on the IBM SP-2.

Since shackling does not impinge on how the remapped data is stored, the techniques described herein can be used to generate code even when the underlying data structure is reshaped. A good example of this is banded Cholesky factorization. The banded Cho-Lesky factorization in LAPACK is essentially the same as regular Cholesky factorization with two caveats: (i) only those statement instances are performed which touch data within a band of the input matrix, and (ii) only the bands in the matrix are stored (in column order), rather than the entire input matrix. In our framework, the initial point code is regular Cholesky factorization restricted to accessing data in the band, and the data shackling we used with regular Cholesky factorization is applied to this restricted code. To obtain the blocked code that walks over a data structure that stores only the bands, a data transformation is applied to the compiler generated code as a post processing step. As seen in FIG. 9, the compiler generated code actually outperforms LAPACK for small band sizes. As the band size increases however, LAPACK performs much better than the compiler generated code. This is because, for large band sizes, LAPACK starts reaping the benefits of level 3 BLAS operations, whereas the xlf back-end (on the IBM SP-2) is once again not able to perform equivalent optimizations for loops in our compiler generated code which implement matrix multiply operations.

Although the invention has been described with respect to various embodiments, it should be realized this invention is also capable of a wide variety of further and other embodiments within the spirit and scope of the appended claims; and implementing integrating the present invention into specific systems must be performed with care to understand the limitations and issues involved with such integration.

What is claimed is:

1. Apparatus for handling a stored data array of elements partitioned into blocks stored in a hierarchical memory that enhances the reuse of blocked stored elements comprising:
   a main memory including a high speed cache memory,
   means for storing a portion of said blocks in the cache memory, and
   data shackles that include i) means for determining the order in which the blocks must be stored in the cache memory, and
   ii) means for determining the operations that must be performed on the elements of said stored portion of said blocks to derive program transformations within a compilation system.

2. The apparatus as defined in claim 1 further comprising:
   means for accessing program statements for determining the operations to be performed on the elements of the stored portion of said blocks,
   means for determining the order in which the stored portion of said blocks are brought into the cache memory, means for selecting the references into said data array from the program statements that touch the elements of the stored portion of said blocks stored in the cache memory, and means for executing all said program statements that touch the elements of the stored portion of said blocks stored in the cache memory.

3. The apparatus as defined in claim 1 further comprising:

means for combining said data shackles.

4. The apparatus as defined in claim 1 further comprising means for performing said operations on the stored portion of said block stored in the cache memory, wherein said operations include imperfectly nested loop operations wherein data reuse is enhanced.

5. A process for handling a stored data array of elements partitioned into blocks stored in a hierarchical memory that enhances the reuse of blocked stored elements comprising:

providing a main memory including a high speed cache memory, storing a portion of said blocks in the cache memory, and determining the order in which the portion of said blocks must be stored in the cache memory, and determining operations that must be performed on the elements of the portion of said blocks stored in the cache memory, such that substantially all the operations are performed thereon, thereby enhancing data reuse by deriving program transformations within a compilation system.

6. The process as defined in claim 5 further comprising:

accessing program statements for determining the operations to be performed on the elements of the stored blocks in the cache memory, determining the order in which blocks must be brought into the cache memory, selecting program references into said data array from the program statements that touch the elements of the stored portion of said blocks stored in the cache memory, and executing all statements touching the elements of the portion of said blocks stored in the cache memory.

7. A compiler for converting a source program into an object program for use by a computer which enhances data locality comprising the apparatus as defined in claim 1.

8. A compiler for converting a source program into an object program for use by a computer which enhances data locality comprising the apparatus as defined in claim 2.

9. A compiler for converting a source program into an object program for use by a computer which enhances data locality comprising the apparatus as defined in claim 3.

10. A compiler for converting a source program into an object program for use by a computer which enhances data locality comprising the apparatus as defined in claim 4.

11. A computer implemented compiler process comprising the processing acts of claim 5.

12. A computer implemented compiler process comprising the processing acts of claim 6.

* * * * *